Jan. 20, 1942.　　　G. KENDE ET AL　　　2,270,311
CAMERA
Original Filed Dec. 13, 1938　　2 Sheets-Sheet 1
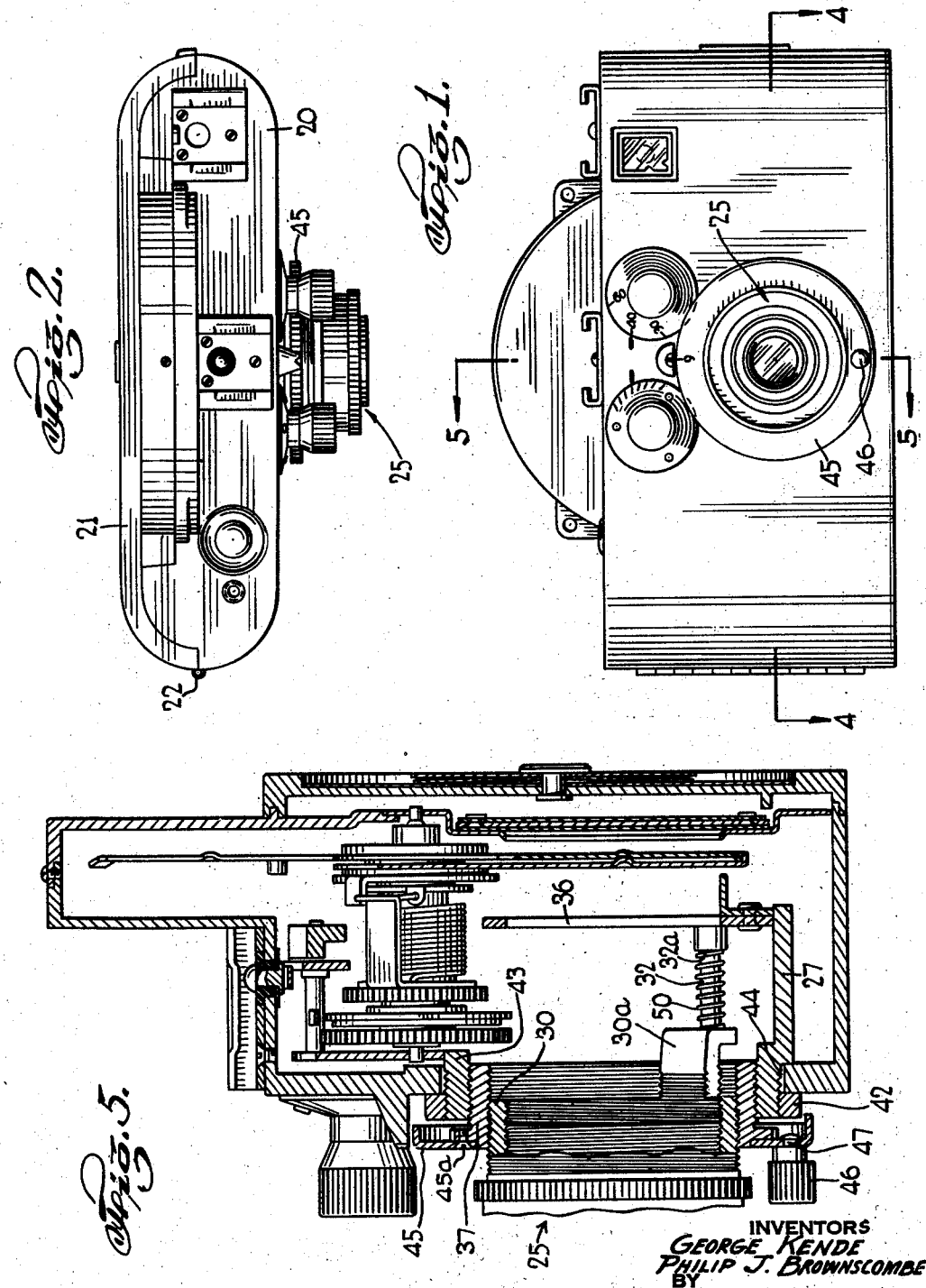
INVENTORS
GEORGE KENDE
PHILIP J. BROWNSCOMBE
BY
ATTORNEY

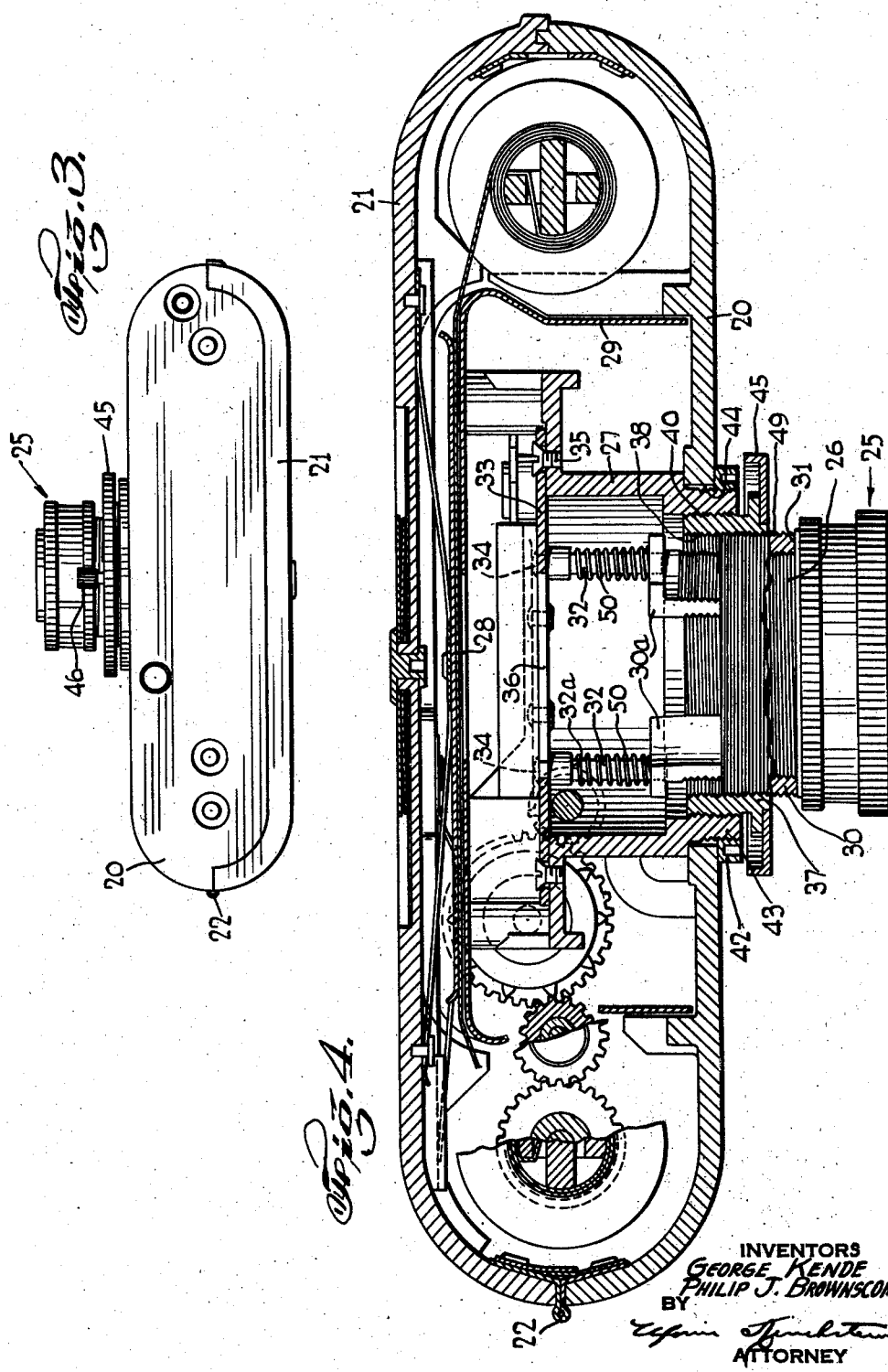

Patented Jan. 20, 1942

2,270,311

UNITED STATES PATENT OFFICE 2,270,311

CAMERA

George Kende, New York, N. Y., and Philip J. Brownscombe, East Orange, N. J., assignors to Universal Camera Corporation, New York, N. Y., a corporation of Delaware Original application December 13, 1938, Serial No. 245,424. Divided and this application July 10, 1940, Serial No. 344,680

6 Claims. (Cl. 95—45)

This invention relates to cameras. More particularly, our invention relates to improvements in camera constructions of the so-called "candid" type.

One of the objects of our invention is to provide an improved camera construction of the character described having novel and highly improved lens mounting and focusing means which shall be so designed as to have a relatively large focusing range with a relatively small movement and which shall be so constructed and arranged that the camera will at all times be in operative condition.

Other objects of this invention will in part be obvious and in part hereinafter pointed out.

Certain features shown and described but not claimed in this application are shown, described and claimed in our copending application, Serial No. 245,424, filed December 13, 1938, now Patent No. 2,233,390 of February 25, 1941, for cameras, of which the present application is a divisional application.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a front elevational view of a camera constructed in accordance with our invention;

Fig. 2 is a top plan view thereof;

Fig. 3 is a bottom plan view thereof;

Fig. 4 is an enlarged cross sectional view taken substantially on the line 4—4 of Fig. 1; and Fig. 5 is an enlarged cross sectional view taken substantially on the line 5—5 of Fig. 1.

Referring now in detail to the drawings, we have disclosed a camera of the type shown and fully described in our said copending application Serial No. 245,424 and generally comprising a front casing part 20, a rear casing part 21, the said casing parts 20 and 21 being interconnected by a suitable hinge member 22 to form a hollow box-like structure designed to house the necessary camera parts, and the mechanisms for operating the same.

In accordance with our invention the following novel lens mounting assembly has been provided. Referring particularly to Figs. 4 and 5 of the drawings, it is seen that a lens assembly 25 having an externally threaded shank 26 is screwed tightly into an inner sleeve 30 to rest up against the shoulder 31. Holes in two projections 30a of the sleeve 30 provide running fits for the inner sleeve posts 32 on which the inner sleeve 30 rides, the said inner sleeve 30 being movable into and out of the camera in an axial direction, while at the same time being held against axial rotation. The sleeve posts 32 are permanently fixed to a mask plate 33 by the rivets 34, the said plate 33 being in turn rigidly fastened to the mounting member 27 by the screws 35. The mounting member 27 is firmly fixed to the camera casing part 20 by a screw threaded clamp ring 42 cooperating with a threaded portion 43 of the member 27, projecting through an opening 44 in the casing part 20. The mask plate 33 is provided with an opening 36 in proper optical register with the light opening 28 in the mechanism supporting frame 29.

A middle sleeve 37 is provided which has a screw thread 38 cut on the inside diameter thereof meshing with the outside thread 49 of the inner sleeve 30, and a screw thread 40 cut on its outside diameter which meshes with the thread cut in the inside diameter of the circular threaded portion 43 of the member 27.

While a satisfactory construction has been made in which the threads 38 and 40 of the middle sleeve 157 have the same pitch, it is understood that they may be of different pitch. However, whereas thread 40 is preferably a double lead thread cut right hand, the thread 38 is preferably a quadruple lead thread cut left hand.

A focusing ring 45 is fixedly attached to the middle sleeve 37 by any suitable attaching means, such as for example flat head screws 45a (see Fig. 5). To facilitate the operation of the focusing ring 45, a knob 46 is permanently fastened thereto by any suitable means, such as the rivet 47.

It is thus seen from the above description that when the focusing ring 45 is rotated in a counter-clockwise direction, the middle sleeve 37 will move in an axial direction out of the camera, and the inner sleeve 30 will also move in the same direction along with the lens assembly 25 which is fixed to the inner sleeve 30. Because of the fact that the thread 40 has a double lead, and the thread 38 has a quadruple lead, and both of said threads have the same pitch, the middle sleeve 37 when traveling one unit of distance will cause the inner sleeve 30, along with the lens assembly 25, to correspondingly travel two units of distance relative to the middle sleeve 37. Therefore, relative to the camera body, the lens assembly 25 has at the same time traveled three units of distance.

When the focusing ring 45 is rotated in a clockwise direction, the lens assembly 25 will be moved in the opposite direction.

The above described mechanism is preferably designed so that if the focusing ring 45 is turned one complete revolution in a counter-clockwise direction, the middle sleeve 37 will travel in an outward direction, with respect to the camera, a distance of 1/16 inch, and the inner sleeve 30 along with the lens assembly 25 will move in the same direction twice the distance of the movement of the middle sleeve 37 or a distance of 1/8 inch. The total distance which the lens assembly 25 would travel outwardly with respect to the camera casing would then be the distance of travel of the middle sleeve 37 plus the distance of travel of the inner sleeve 30, or 3/16 inch.

In other words, the travel of the lens assembly 25 with respect to the camera body is the result of adding the travel of the middle sleeve 37 with respect to the camera body to the travel of the inner sleeve 30 relative to the middle sleeve 37. Thus, by our construction, two additive movements of thread systems are accomplished by the turning of a single member.

This ratio of movement between the middle sleeve 37 and the inner sleeve 30 will always be constant irrespective of the direction of rotational movement of the focusing ring 45.

If desired the ratio between the movements of the sleeves 37 and 30 may be made less than that above described; we prefer, however, to have said ratio at least 1 to 1 in order to obtain a beneficial effect by employing the disclosed additive thread construction.

Coil springs 50 encircling the posts 32 and interposed between a shoulder 32a of the posts 32 and the inner sleeve 30 serve to maintain a good rubbing contact between all the threads in the above described assembly. Thus, no slack or objectionable play can develop in the threaded joints, and accuracy of focus of the lens is thereby assured.

The outer surface of the focusing ring 45 may be provided with suitable markings to indicate desired focal settings, designed to cooperate with a stationary line mark on the camera casing.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a camera of the character described, the combination of a casing having an opening, a mounting member within said casing and having a tubular portion thereof projecting through said opening, an inner sleeve having a lens assembly mounted thereon for movement therewith, said sleeve being provided with an outside thread, a pair of sleeve posts fixedly supported by said mounting member, said inner sleeve being slidable on said sleeve posts, said tubular projecting portion being screw threaded on the inside and on the outside thereof, and a threaded clamp ring cooperating with said outside threaded tubular portion to maintain the mounting member fixed to said casing.

2. In a camera of the character described, the combination of a casing having an opening, a mounting member within said casing and having a tubular portion thereof projecting through said opening, an inner sleeve having a lens assembly mounted thereon for movement therewith, said sleeve being provided with an outside thread, a pair of sleeve posts fixedly supported by said mounting member, said inner sleeve being slidable on said sleeve posts, said tubular projecting portion being screw threaded on the inside and on the outside thereof, a threaded clamp ring cooperating with said outside threaded tubular portion to maintain the mounting member fixed to said casing, a middle sleeve, said middle sleeve having an inside thread meshing with said inner sleeve outside thread, an outside thread meshing with the inside thread of said projecting tubular portion of said mounting member, said middle sleeve outside thread being cut opposite to the said middle sleeve inside thread, and resilient means to urge said inner sleeve axially.

3. In a camera of the character described, the combination of a casing having an opening, a mounting member within said casing and having a tubular portion thereof projecting through said opening, an inner sleeve having a lens assembly mounted thereon for movement therewith, said sleeve being provided with an outside thread, a pair of sleeve posts fixedly supported by said mounting member, said inner sleeve having apertures therein parallel to the axis of said sleeve and slidably received on said sleeve posts, said tubular projecting portion being screw threaded on the inside and on the outside thereof, a threaded clamp ring cooperating with said outside threaded tubular portion to maintain the mounting member fixed to said casing, a middle sleeve, said middle sleeve having an inside thread meshing with said inner sleeve outside thread, and an outside thread meshing with the inside thread of said projecting tubular portion of said mounting member, said middle sleeve outside thread being cut opposite to the said middle sleeve inside thread and having the same pitch and twice the lead thereof.

4. In a camera of the character described, the combination of a casing having an opening, a mounting member within said casing and having a tubular portion thereof projecting through said opening, an inner sleeve having a lens assembly mounted thereon for movement therewith, said sleeve being provided with an outside thread, a pair of sleeve posts fixedly supported by said mounting member, said inner sleeve having apertures therein parallel to the axis of said sleeve and slidably received on said sleeve posts, said tubular projecting portion being screw threaded on the inside and on the outside thereof, a threaded clamp ring cooperating with said outside threaded tubular portion to maintain the mounting member fixed to said casing, a middle sleeve, said middle sleeve having an inside thread meshing with said inner sleeve outside thread, an outside thread meshing with the inside thread of said projecting tubular portion of said mounting member, said middle sleeve outside thread being cut opposite to the said middle sleeve inside thread and having the same pitch and twice the lead thereof, said middle sleeve outside thread being a double lead thread cut right hand and said middle sleeve inside thread being a quadruple lead thread cut left hand, whereby the axial movement of the middle sleeve relative to the mounting member will cause the inner sleeve, having the lens assembly attached thereto, to correspondingly axially move three times that distance relative to the mounting member, and resilient means to urge said inner sleeve axially.

5. In a camera of the character described, the combination of a casing having an opening, a mounting member having a tubular portion thereof projecting through said opening, an inner sleeve having a lens assembly mounted thereon for movement therewith, said sleeve being provided with an outside thread, a pair of sleeve posts fixedly supported by said mounting member, said inner sleeve having apertures therein parallel to the axis of said sleeve and slidably received on said sleeve posts, said tubular projecting portion being screw threaded on the inside and on the outside thereof, a threaded clamp ring cooperating with said outside threaded tubular portion to maintain the mounting member fixed to said casing, a middle sleeve, said middle sleeve having an inside thread meshing with said inner sleeve outside thread, and an outside thread meshing with the inside thread of said projecting tubular portion of said mounting member, said middle sleeve outside thread being cut opposite to the said middle sleeve inside thread and having the same pitch and twice the lead thereof, said middle sleeve outside thread being a double lead thread cut right hand, the said middle sleeve inside thread being a quadruple lead thread cut left hand, whereby the axial movement of the middle sleeve relative to the mounting member will cause the inner sleeve, having the lens assembly attached thereto, to correspondingly axially move three times that distance relative to the mounting member, a focusing ring fixed to the said middle sleeve for rotation therewith, and resilient means to urge said inner sleeve axially.

6. In a camera of the character described, the combination of a casing having an opening, a mounting member having a tubular portion thereof projecting through said opening, an inner sleeve having a lens assembly mounted thereon for movement therewith, said sleeve being provided with an outside thread, a pair of sleeve posts fixedly supported by said mounting member, said inner sleeve having apertures therein parallel to the axis of said sleeve and slidably received on said sleeve posts, said tubular projecting portion being screw threaded on the inside and on the outside thereof, a threaded clamp ring cooperating with said outside threaded tubular portion to maintain the mounting member fixed to said casing, a middle sleeve, said middle sleeve having an inside thread meshing with said inner sleeve outside thread, and an outside thread meshing with the inside thread of said projecting tubular portion of said mounting member, the said inside and outside threads of the middle sleeve being of the same pitch, said middle sleeve outside thread being cut opposite to the said middle sleeve inside thread and having the same pitch and twice the lead thereof, said middle sleeve outside thread being a double lead thread cut right hand and said middle sleeve inside thread being a quadruple lead thread cut left hand, whereby the axial movement of the middle sleeve relative to the mounting member will cause the inner sleeve, having the lens assembly attached thereto, to correspondingly axially move three times that distance relative to the mounting member, a focusing ring fixed to the said middle sleeve for rotation therewith, a projecting member fixed to said focusing ring to facilitate the manual movement thereof, and resilient means to urge said inner sleeve axially.

GEORGE KENDE.
PHILIP J. BROWNSCOMBE.